(12) United States Patent
Biegelsen et al.

(10) Patent No.: US 6,335,084 B1
(45) Date of Patent: Jan. 1, 2002

(54) ENCODED SHEET MATERIAL AND SHEET PROCESSING APPARATUS USING ENCODED SHEET MATERIAL

(75) Inventors: David K. Biegelsen, Portola Valley; Jock D. MacKinlay, Palo Alto, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/222,920

(22) Filed: Dec. 30, 1998

(51) Int. Cl.⁷ .............................. B32B 23/02; B42F 21/00
(52) U.S. Cl. ........................ 428/192; 428/29; 428/195; 283/36; 283/45; 283/94
(58) Field of Search ...................... 428/192, 195; 283/36, 45, 94

(56) References Cited

U.S. PATENT DOCUMENTS

| | | | | |
|---|---|---|---|---|
| 4,927,178 A | * | 5/1990 | Schechter | 283/38 |
| 4,949,999 A | * | 8/1990 | Ke-hui | 283/38 |
| 5,085,417 A | | 2/1992 | Copham | |

FOREIGN PATENT DOCUMENTS

| | | |
|---|---|---|
| DE | 297 15 06 U1 | 11/1997 |
| JP | A-6-309519 | 11/1994 |
| JP | A-9-134415 | 5/1997 |

OTHER PUBLICATIONS

Published Japanise Patent Application, Filing date May 11, 1884, Dec. 1985.*

* cited by examiner

*Primary Examiner*—Cynthia H. Kelly
*Assistant Examiner*—Betelhem Shewareged
(74) *Attorney, Agent, or Firm*—Oliff & Berridge, PLC

(57) ABSTRACT

An encoded sheet material includes a sheet of material that has a first surface, a second surface disposed opposite the first surface and an edge extending between the first and second surfaces and peripherally about the sheet of material. The edge has indicia arranged on it to form a code that identifies at least one characteristic of the sheet of material. A sheet processing apparatus uses the encoded sheet material and includes a code reader device and a processor. The code reader device reads the code. The processor communicates with the code reader device and causes the sheet processing apparatus to process the sheet of material based upon the read code. An encoded image recording medium and image recording apparatuses are also described.

26 Claims, 7 Drawing Sheets

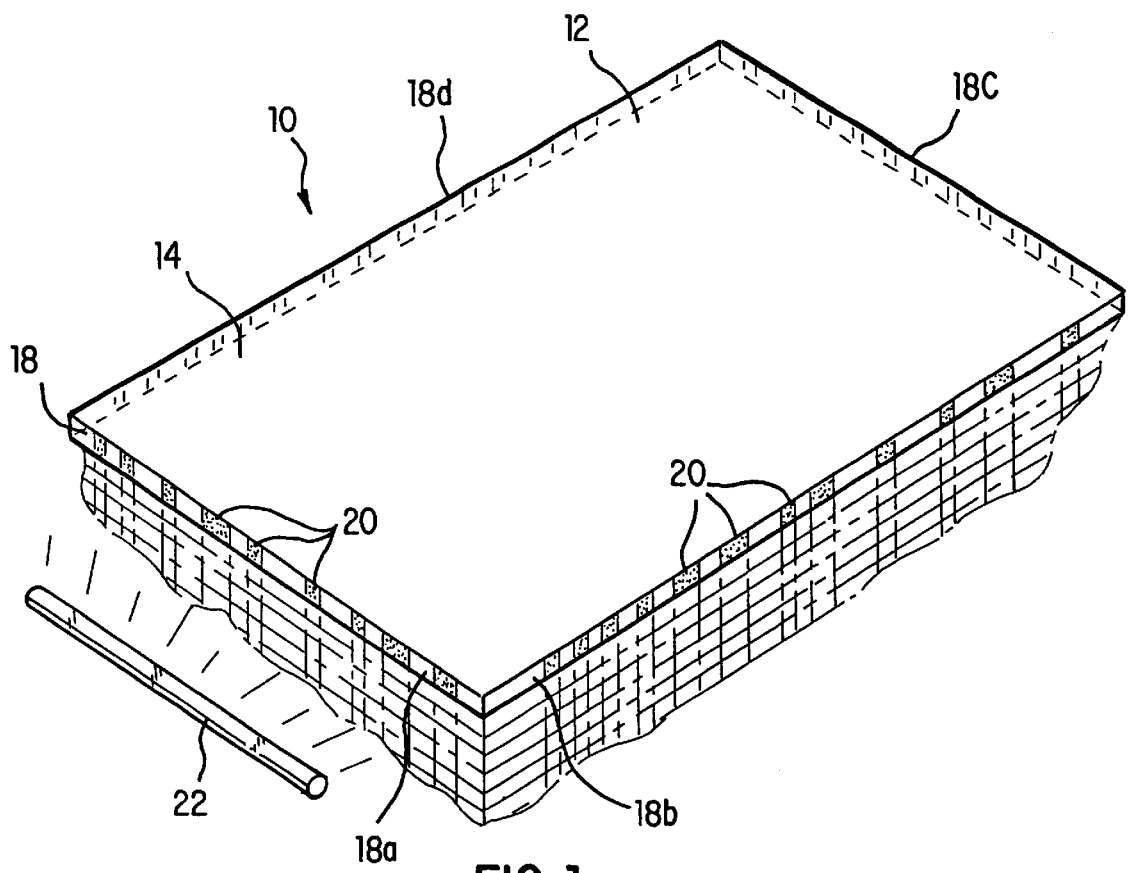
FIG. 1
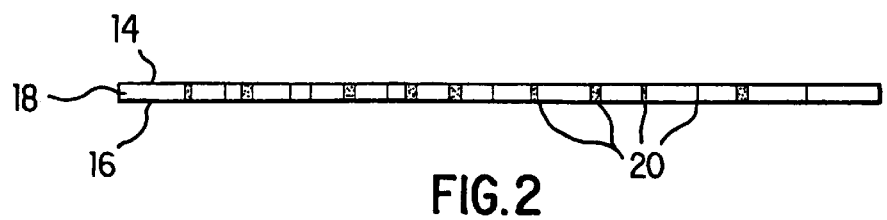
FIG. 2
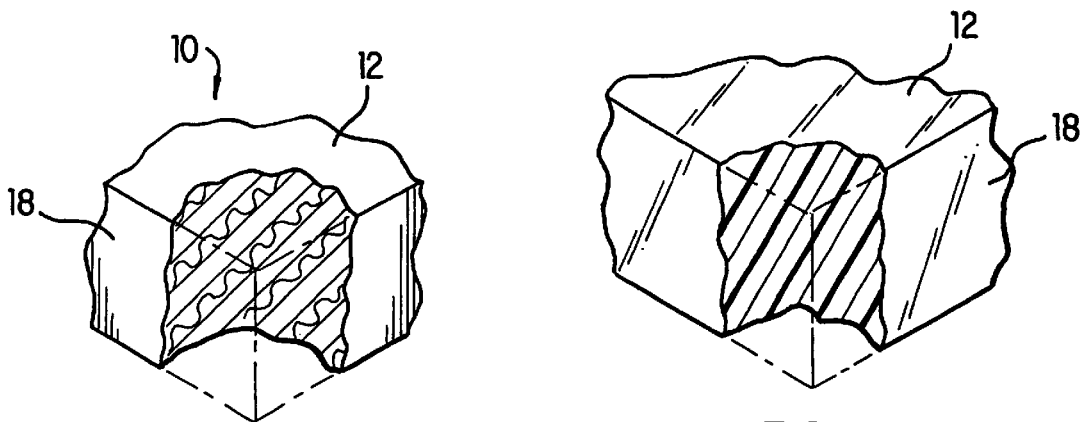
FIG. 3
FIG. 4

ENCODED SHEET MATERIAL AND SHEET PROCESSING APPARATUS USING ENCODED SHEET MATERIAL

BACKGROUND OF THE INVENTION

1. Field of Invention

The invention is directed to an encoded sheet material and sheet processing apparatuses that use the encoded sheet material. More particularly, the invention relates to an encoded image recording medium and image recording apparatuses that use the encoded image recording media.

2. Description of Related Art

Many different types of image recording devices are available in the market place. Such image recording devices include photocopying machines, laser, ink jet and dot-matrix printers, facsimile machines and offset printing presses. Each of these image recording devices use one or more types of image recording media in a form of sheet material. The photocopying machine, for example, can form an image on either paper or a plastic transparency. Also, the photocopy machine can form an image on various sizes of the recording medium. For instance, the photocopying machine can use the recording medium having various sizes such as 8 ½"×11", 8½"×14" and A4 sizes.

However, when a user desires to photocopy an image on a plastic transparency, for example, the user must load one or more plastic transparencies in an appropriate source tray of the photocopy machine. More sophisticated photocopying machines include multiple source trays for retaining a variety of recording media. The user must now remember which particular source tray contains the plastic transparency and must select that particular source tray on the photocopy machine in order to produce a plastic transparency with the desired image.

Even with the more sophisticated photocopy machines, little information regarding the type of recording media being used is provided. As suggested above, the user can select one of a variety of sizes of the recording media upon which an image is to be formed. Usually, sensors in each source tray provide size information that is displayed on a display positioned in the console of the photocopying machine. Less sophisticated photocopying machines have source trays that are sized to accommodate only one particular size of the recording media.

Thus, it is possible that the user can determine the size of the recording medium by viewing the console of the photocopying machine. Otherwise, in order for the user to ascertain any other information regarding the recording media, the user must ascertain this information on his/her own accord.

Furthermore, if the user desires to photocopy a document that includes a variety of types of recording media, the user must load each type of the recording media in respective ones of the multiple source trays. Once the selected number of photocopies for each type of the recording media is produced, the photocopied document is then collated to produce the desired document with the appropriate types of recording media. For example, the desired photocopied document might include a first page as a transparency with a company logo form thereon, a second page as a sheet of bond quality paper bearing the title of the document, subsequent pages as standard photocopy paper containing the body of the document and a last page as a black card stock. For many types of photocopying machines, each of the different types of recording media must be first photocopied and then collated and assembled into the desired photocopied document.

SUMMARY OF THE INVENTION

One embodiment of the invention is an encoded sheet material. The encoded sheet material includes a sheet of material that has a first surface, a second surface disposed opposite the first surface and an edge. The edge extends between the first and second surfaces and peripherally about the sheet of material. The edge has indicia that is arranged thereon to form a code that identifies at least one characteristic of the sheet material.

Another embodiment of the invention is a sheet processing apparatus. The sheet processing apparatus includes a sheet of material, a code reader device and a processor. The sheet of material has indicia arranged on it to form a code that identifies information related to the sheet of material. The code reader device is operative in conjunction with the encoded sheet of material for reading the code. The processor communicates with the code reader device and causes the sheet processing apparatus to process the sheet of material based upon the read code.

Another embodiment of the invention is an encoded image recording medium. The encoded image recording medium of the invention includes a sheet fabricated from an image recording material and has a first surface, a second surface which is disposed opposite the first surface and an edge that extends between the first and second surfaces and peripherally about the sheet. The edge has indicia arranged on it to form a code that identifies at least one characteristic of the sheet.

Another embodiment of the invention is an encoded image recording medium that includes a plurality of sheets as described above. The plurality of sheets are stacked in facial registration with one another.

Another embodiment of the invention is an image recording apparatus that forms an image on a selected type of image recording medium. The image recording apparatus includes a first type of image recording medium, a code reader device, an input device and a processor. The first type of image recording medium has indicia that is arranged on it to form a code that identifies the first type of image recording media. The code reader device is operative in conjunction with the encoded first type of image recording medium to read the indicia to identify the first type of image recording media. The input device provides an input signal representative of the selected type of the image recording medium. The processor is in communication with the code reader device and the input device and determines that the first type of image recording medium is identified as the selected type of image recording medium. The processor also causes the image recording apparatus to form the image on the first type of image recording medium upon determining that the first type of image recording medium is identified as the selected type of image recording medium.

BRIEF DESCRIPTION OF THE DRAWINGS

Other features of the invention will become apparent as the following description proceeds and upon reference to the drawings in which:

FIG. 1 is a perspective view of an encoded image recording medium of the invention;

FIG. 2 is a side elevational view of the encoded image recording medium shown in FIG. 1;

FIG. 3 is a partial perspective view partially broken away illustrating that the encoded image recording medium is fabricated of paper;

FIG. 4 is a partial perspective view partially broken away illustrating that the encoded image recording medium is fabricated of transparent plastic;

DETAILED DESCRIPTION OF PREFERRED EMBODIMENTS

Figure 5:
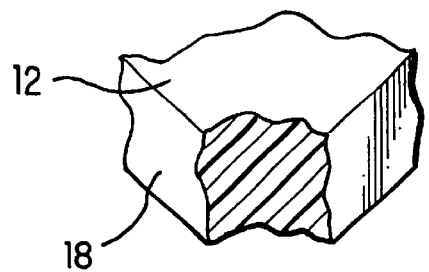
FIG. 5 is a partial perspective view partially broken away illustrating that the encoded image recording medium is fabricated of opaque plastic.

A first embodiment of an encoded image recording medium 10 of the invention is generally introduced in FIGS. 1–7. The encoded image recording medium is a pliable sheet 12 that is fabricated from an image recording material. One of ordinary skill in the art would appreciate that the image recording material is typically paper (FIG. 3) or plastic (FIGS. 4 and 5) although other materials upon which a printed image can be formed can also be used. Thus, the sheet 12 can also be fabricated from sheet metal, metal foil or any other type of sheet material upon which a image can be printed.

As best shown in FIG. 2, the sheet 12 has a first surface 14 and a second surface 16 which is shown opposite the first surface 14. Also, the sheet 12 includes an edge 18 that extends between the first surface 14 and the second surface 16 and extends peripherally about the sheet 12. As best shown in FIGS. 1 and 2, the edge 18 has indicia 20 that is arranged on the edge 18 to form a code that identifies at least one characteristic of the sheet. A skilled artisan would appreciate that the code can be a simple, self-clocked redundant code, a conventional bar code or other such code commonly known in the art. The indicia can also be either visible or invisible. It is desirable to provide the indicia as being invisible for aesthetic purposes. The invisible indicia are formed by an invisible ink such as fluorescent ink which is invisible to a human eye unless exposed to an ultra-violet light source 22 as shown in FIG. 1. When exposed to the ultra-violet light source 22, the invisible indicia can be read as a visible indicia by a user. Alternatively, the indicia can be read by a scanner device operably connected to a computer-implemented processor, as discussed in detail below.

By way of example, the code might be formed of 1 mm (millimeter) wide bits on a 2 mm wide pitch. Then, for a standard 8½"×11" sheet of paper, an edge of 200 mm on the 8½ inch side of the sheet could have 100 bits of information encoded on the edge. One hundred bits of information can encode approximately $2^{100}$ (or $10^{30}$) pieces of information which, in practice, would be somewhat reduced by redundancy coding. However, the amount of information would be more than adequate to identify the characteristics of the sheet 12. Such characteristics of the sheet 12 includes a weight of the sheet 12, a thickness of the sheet 12, a quality of the sheet 12, a stiffness of the sheet 12, a grain orientation of the sheet 12, a classification of the sheet 12, a punch hole pattern of the sheet 12 and an orientation of the sheet 12. As shown in FIG. 3, one classification of the sheet 12 is a standard sheet of paper. As shown in FIG. 4, the classification of the sheet 12 is a transparent sheet of plastic. In FIG. 5, the classification of the sheet 12 is an opaque sheet of plastic.

One of ordinary skill in the art would appreciate that a round or circular sheet 12 would include only a single edge 18. However, the sheet 12 includes a plurality of edges 18. As shown in FIG. 1, the sheet 12 includes four edge portions 18a–18d with each of the edge portions 18a–18d having indicia formed thereon. If desired, each of the four edge portions 18a–18d can include identical indicia. However, it may be desirable to form identical indicia on opposing edge portions such as opposing edge portions 18a and 18c and opposing edge portions 18b and 18d. Further, it might be desirable to form indicia on each of the edge portions 18a–18b that includes indicia that are different from each other.

Also, a skilled artisan would appreciate that the sheet 12 could be triangularly-shaped and thus include three edge portions. With a triangularly-shaped sheet, the indicia can be formed on either one edge portion, two edge portions or all three edge portions. Further, if the indicia is formed on at least two of the three edge portions, the indicia can be either identical to each other or different from each other.

Figure 6:
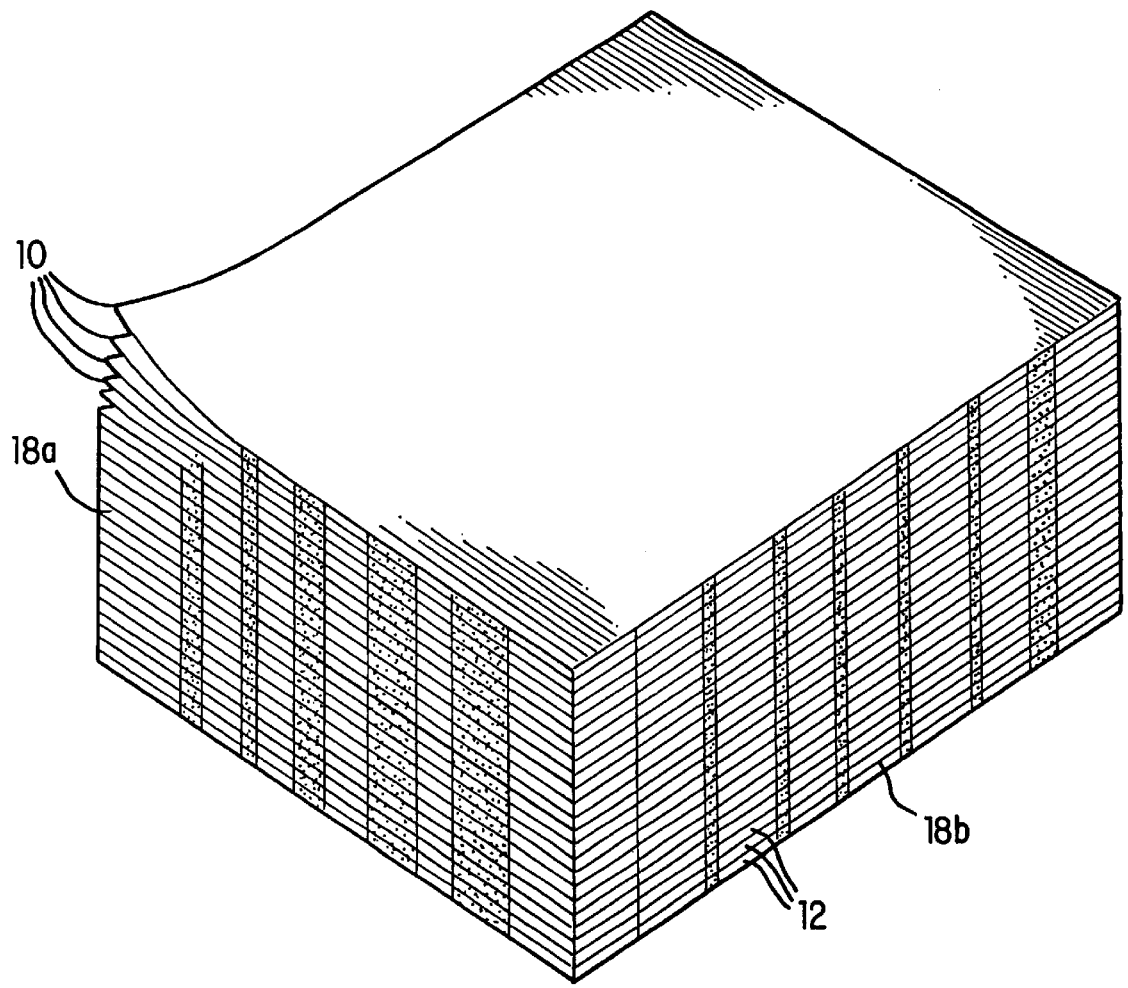
FIG. 6 is a perspective view of a stack of encoded image recording media with each encoded image recording medium having an identical code formed on an edge of each image recording medium.
Figure 7:
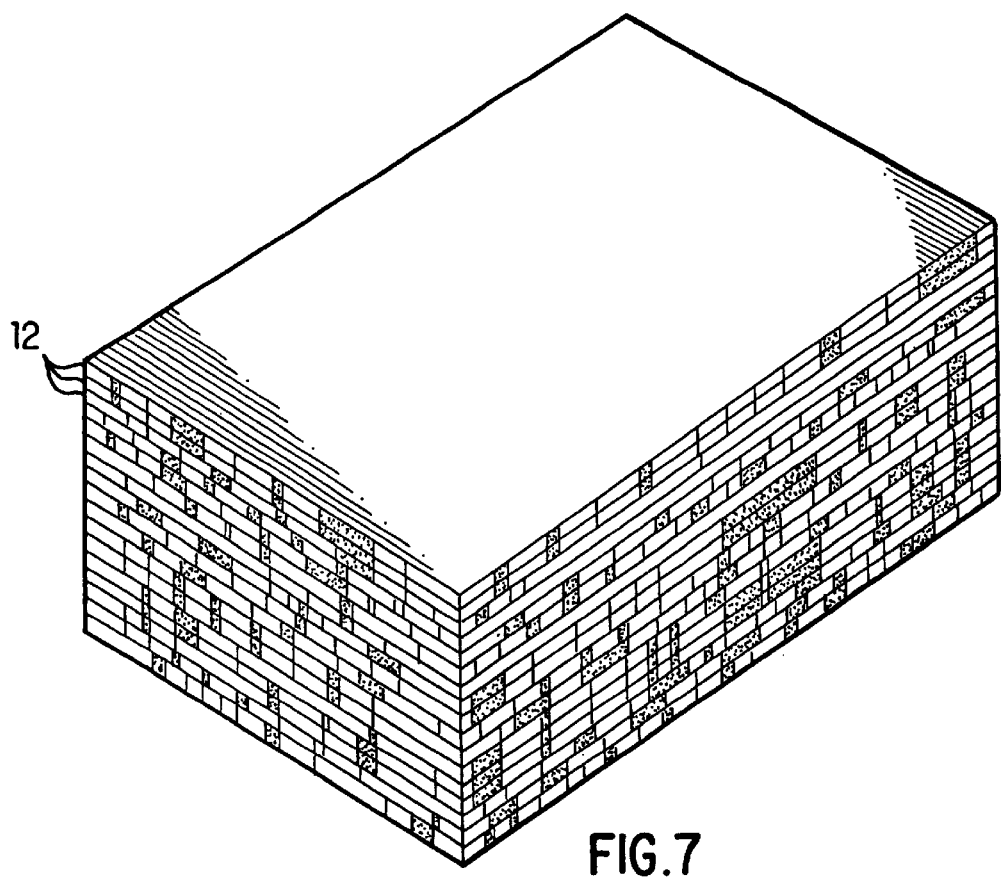
FIG. 7 is a perspective view of a stack of encoded image recording media with each encoded image recording medium having identical as well as different codes formed on the edge of each image recording medium.

FIGS. 6 and 7 illustrate a plurality of sheets 12 (i.e. the encoded image recording media) that are stacked in facial registration with one another. In FIG. 6, the edge portions 18a and 18b include indicia that are identical to the other sheets stacked thereon. In FIG. 7, the indicia formed on the edge portions 18a and 18b are different from at least adjacent ones of the sheets. Thus, each sheet 12 in FIG. 7 has indicia that is different from adjacent sheets. Also, in FIG. 7, some sheets 12 that are interleaved with one another are identical while other ones are different. Therefore, it is appreciated that it is possible to interleave a plurality of sheets 12 which are stacked in facial registration that might not have indicia that are identical with one another.

Figure 8:
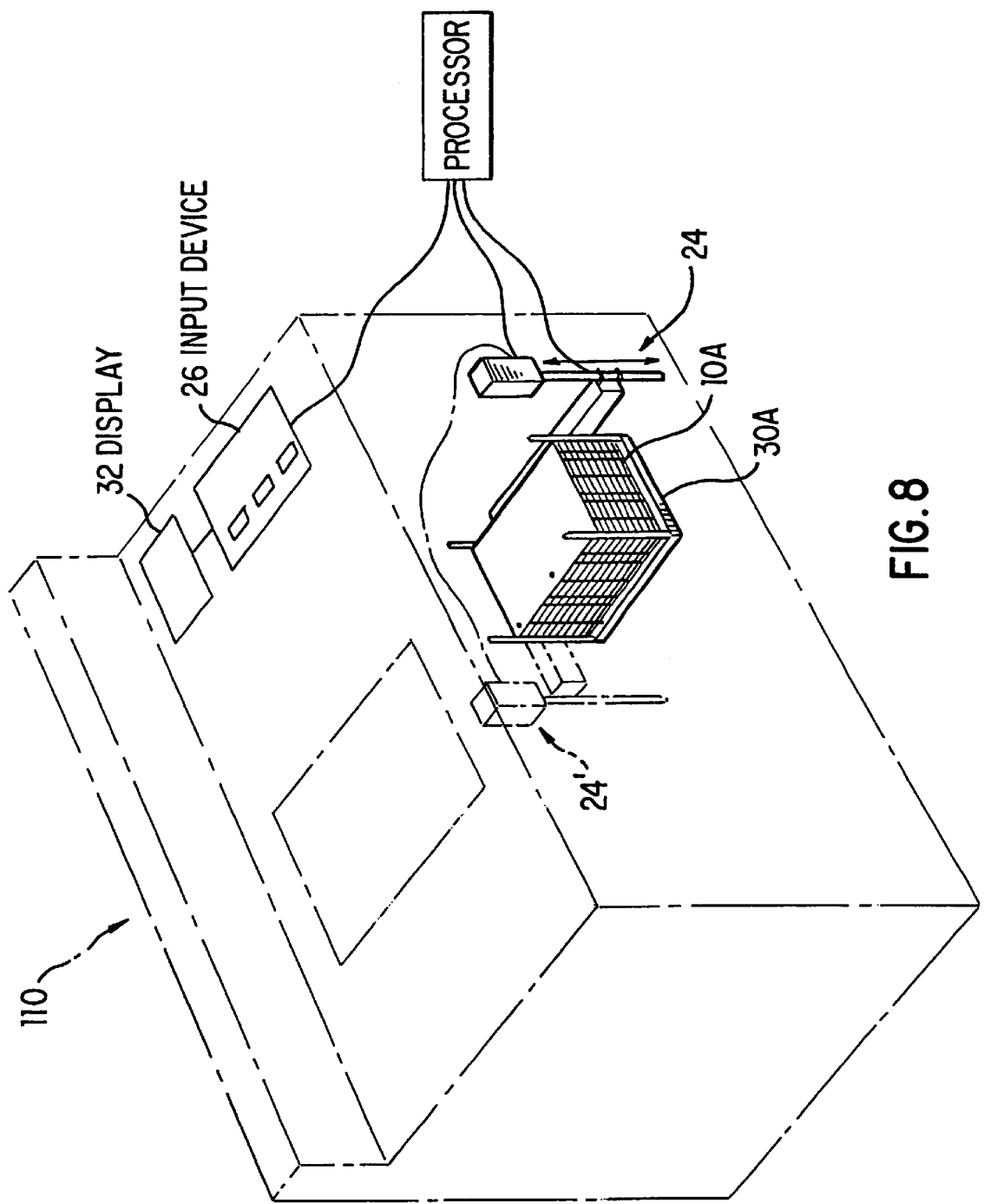
FIG. 8 is an image recording apparatus of the invention.

An image recording apparatus 110 of the invention is illustrated in FIG. 8. The image recording apparatus 110 is illustrated as a photocopier. However, one of ordinary skill in the art would appreciate that the image recording apparatus 110 can also be a printer, a facsimile machine, an offset printing press or other device that prints or otherwise forms images on sheet media. The image recording apparatus 110 forms an image on a selected type of image recording media and includes a first type of image recording media 10A, a code reader device 24, an input device 26 and a processor 28. The first type of image recording media 10A has indicia arranged thereon that forms a code to identify each sheet as being the first type of image recording media 10A. The first type of image recording media 10A is disposed in a first source tray 30A. The code reader device 24 is operative in conjunction with the encoded first type of image recording media 10A in order to read the indicia as identification of the first type of image recording media 10A.

The input device 26 is operated by a user for selecting the selected type of image recording medium desired by the user. Once selected, the input device provides an input signal that is representative of the selected type of image recording medium.

The processor 28 is in communication with the code reader device 24 and the input device 26 for determining whether the first type of image recording media 10A is identified as the selected type of image recording media. Upon determining that the first type of image recording media 10A is identified as the selected type of image recording media, the processor 28 causes the image recording apparatus 110 to form the image on the first type of image recording media 10A.

The image recording apparatus 110 of the invention also includes a display 32. If the processor 28 determines that the first type of image recording media 10A cannot be identified as the selected type of image recording media that was selected by the user, a message appears in the display 32 indicating that the select type of image recording medium is not available for forming an image thereon. As a result, the processor 28 prevents the image recording apparatus 110 of the invention from forming the image on the first type of image recording media that is disposed in the first source tray 30A.

Figure 9:
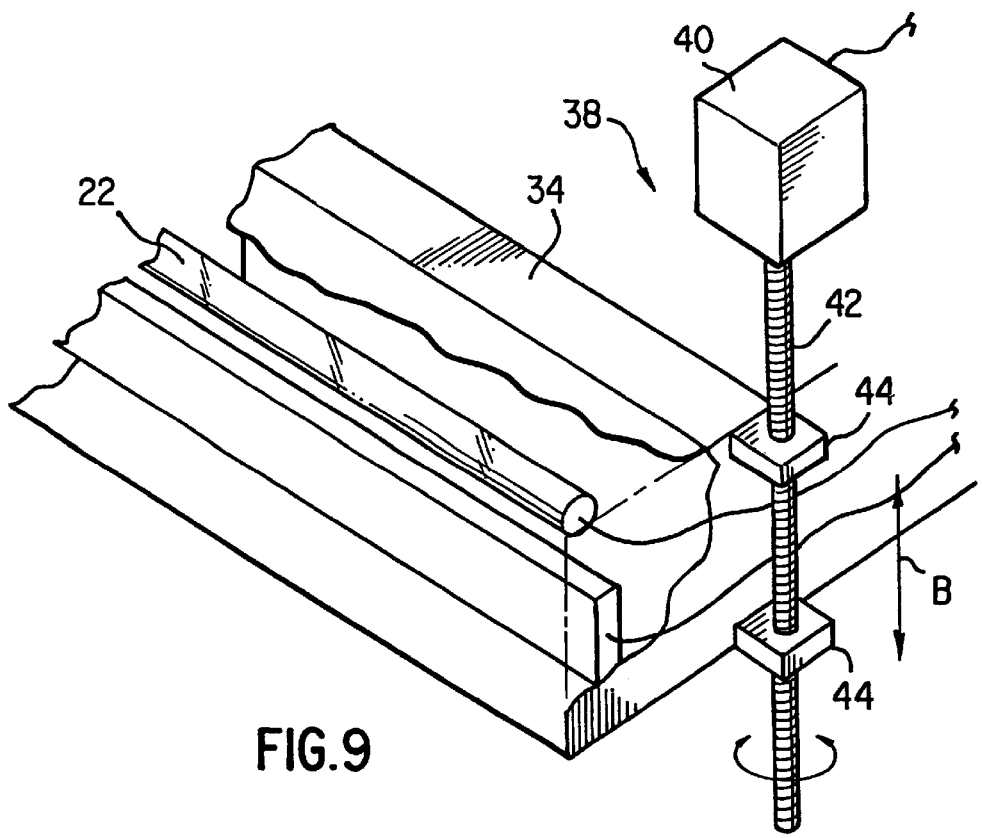
FIG. 9 is an enlarged partial perspective view of a scanner device shown in FIG. 8.

As shown in FIG. 9, the code reader device 24 includes a housing 34, the ultra-violet light source 22 and a charge couple device (CCD) 36. The code reader device 24 also includes an actuator assembly 38 that causes the housing 34 that contains the CCD 36 and the ultra-violet light source 22 to move in a direction shown by arrow B. The actuator assembly 38 has a motor 40 that rotates a threaded shaft 42 that is threadably engaged with a pair of housing mounts 44. The motor 40 is operably connected with the processor 28 and, upon receiving the appropriate signal from the processor 28, rotates the threaded shaft in order to move the housing 34. Thus, scanning of the code of the first type of image recording media 10A can be achieved so that the processor 28 can identify the first type of image recording media 10A.

Also, in FIG. 8, a second code reader device 24' is drawn in phanthom. The second code reader device 24' might be used if the indicia on the two different edges aligned with the respective code reader devices 24 and 24' are different. A skilled artisan would appreciate that the second code reader device 24' would be operably connected to the processor 28 in a manner similar to the code reader device 24.

The code reader device 24 and the second code reader device 24' can be conventional scanner devices. Other types of scanner devices and arrangements for operating the scanner devices are known in the art. For instance, rather than moving the code reader device 24, it would be possible to fix the code reader device in a stationary state and move the source tray 30A in order to read the indicia (i.e. the code) on the edge of the image recording media.

Figure 10:
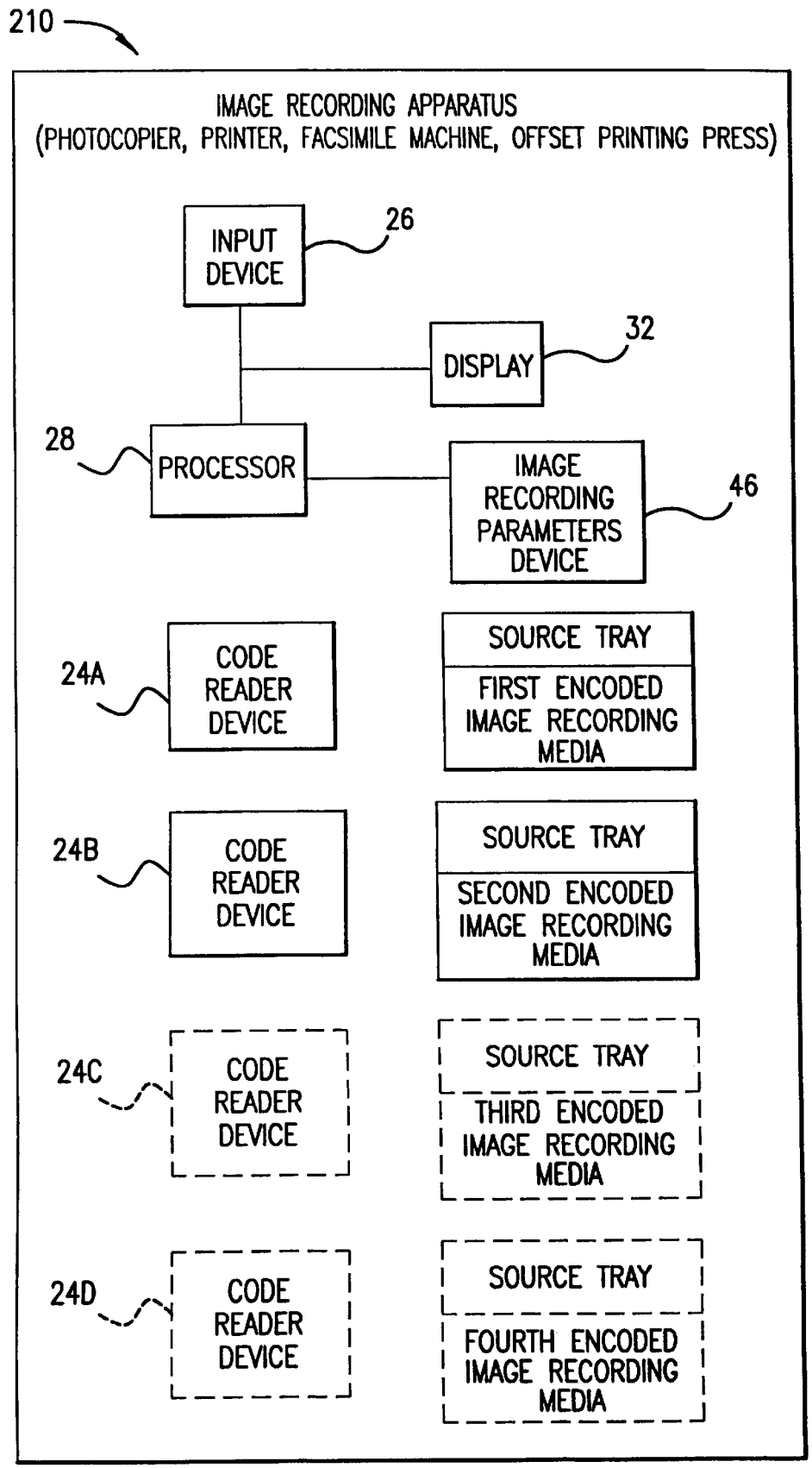
FIG. 10 is a schematic view of a second image recording apparatus of the invention that includes a plurality of scanner devices and associated source trays with encoded image recording media.

Another embodiment of the image recording apparatus 210 of the invention is illustrated diagrammatically in FIG. 10. The image recording apparatus 210 of the invention is similar to the image recording apparatus 110 of the invention discussed above. However, the image recording apparatus 210 of the invention includes a plurality of code reader devices 24A–24D. Each code reader device 24A–24D is operably associated with a respective source tray 30A–30D.

For implementing the image recording apparatus 210 of the invention, it is preferred that each source tray 30A–30D contains a respective first, second, third and fourth image recording media. Preferably, each of the first, second, third and fourth image recording media are different from one another.

The operation of the image recording apparatus 210 of the invention is best explained by the following example. The first encoded image recording media are transparencies, the second encoded image recording media are company letterhead on bond paper, the third encoded image recording media are standard photocopy paper having a left-handed three-hole pattern and the fourth encoded image recording media are paper card stock. The user uses the input device 26 and requests 20 copies of a 10-page company brochure. The user requests that the first page of each copy is a transparency with the company logo to be printed thereon; the second page is a company letterhead with an introductory message to be printed thereon; pages 3–9 is the text describing the company's services; and the last page is a back cover printed with the company's name, address and phone number that provides structural support for the remaining pages. A skilled artisan would appreciate that the image recording apparatus 210 of the invention can now make 20 photocopies of the original 10-page company brochure without having to manually change types of the recording media or perform any manual collation.

Also, the image recording apparatus 210 of the invention includes an image recording parameters device 46 that is operably connected with the processor 28. It is now possible that the processor 28 can change the operating parameters of the image recording apparatus 210 of the invention to facilitate printing or imaging of the particular type of image recording media that is being used. The image recording apparatus 210 operates in accordance with the image recording parameters. The processor 28 adjusts the image recording parameters based upon the selected type of image recording media. For example, the card stock used as the fourth image recording media is thicker than photocopy paper. The processor 28 is now capable of adjusting the rollers within the image recording apparatus 210 to facilitate movement of the card stock through the imaging process at an optimum distance between adjacent rollers.

Figure 11:
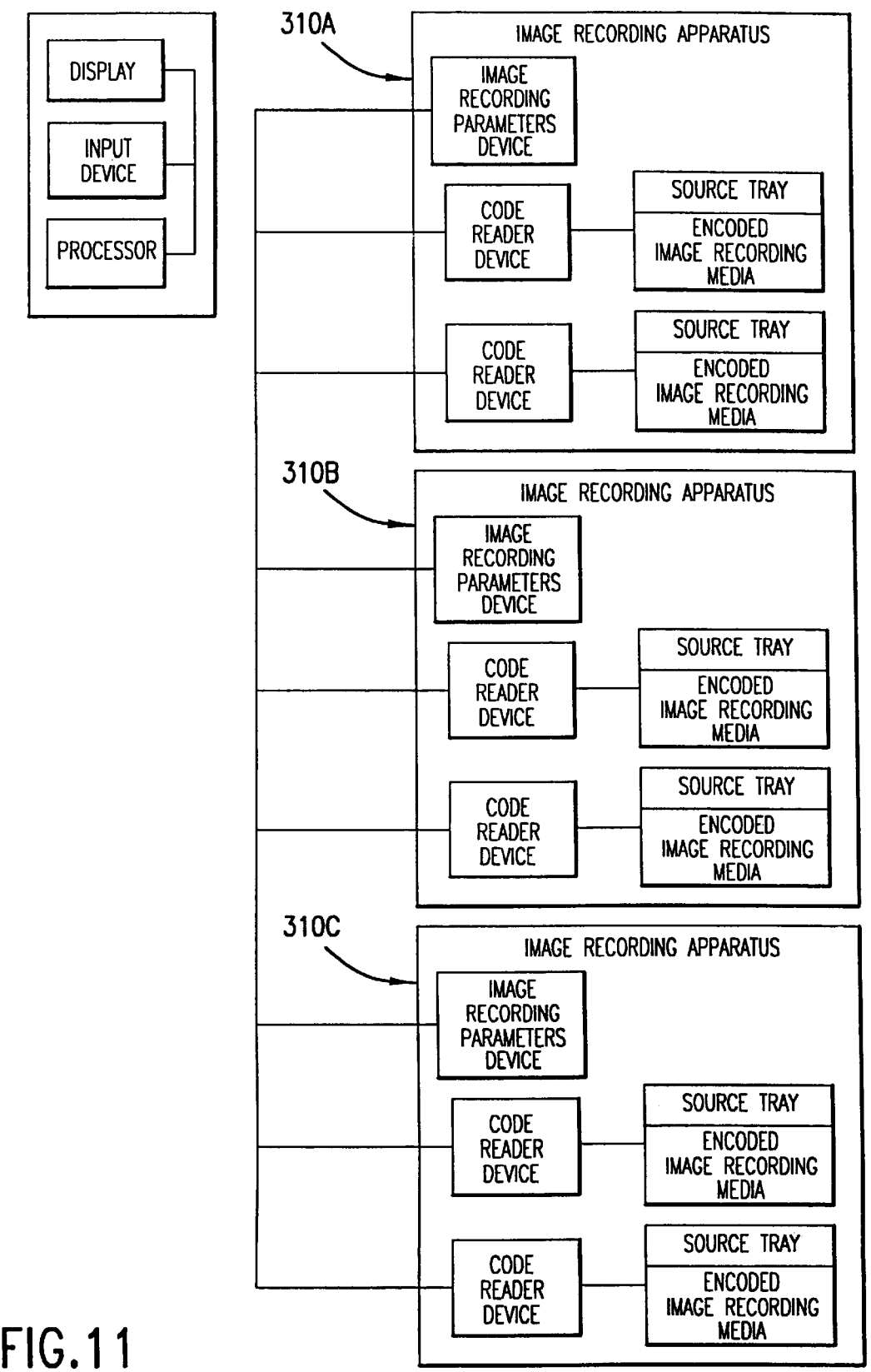
FIG. 11 is a schematic view of a third image recording apparatus of the invention that includes a plurality of image recording apparatuses networked together.

FIG. 11 illustrates another embodiment of the image recording apparatus 310 of the invention. Here, a plurality of image recording apparatuses 310A–310C are networked together. Although not by way of limitation, the input device 26, the processor 28 and the display 32 are disposed separately from the network of image recording apparatuses 310A–310C. One of ordinary skill in the art would appreciate that a document to be photocopied that requires, for example, six different types of image recording media can be made using the networked image recording apparatuses 310A–310C.

Figure 12:
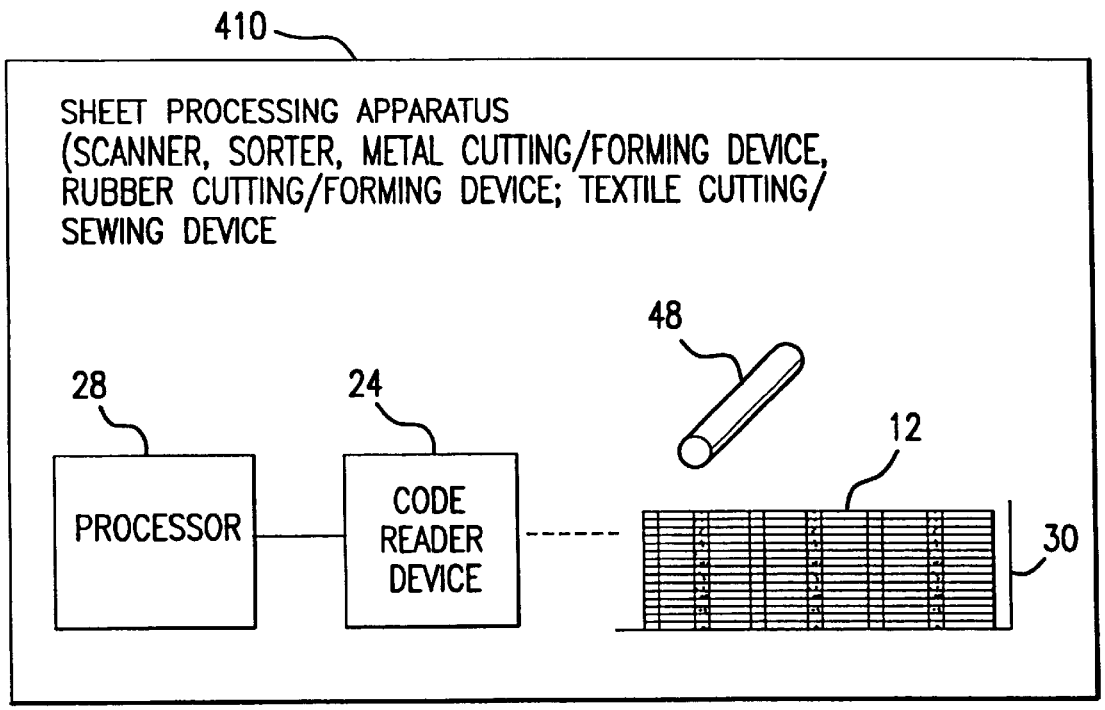
FIG. 12 is a schematic view of a sheet processing apparatus of the invention.
Figure 13:
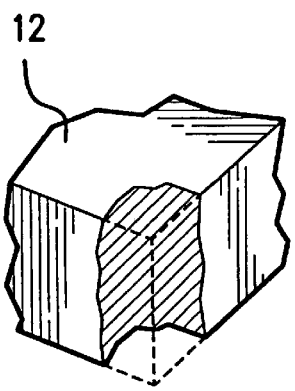
FIG. 13 is a partial prospective view partially broken away illustrating a sheet of material fabricated of metal.
Figure 14:
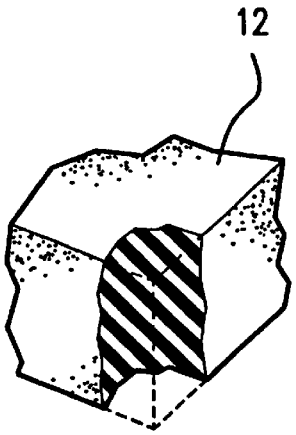
FIG. 14 is a partial prospective view partially broken away illustrating that the sheet of material is fabricated of rubber.
Figure 15:
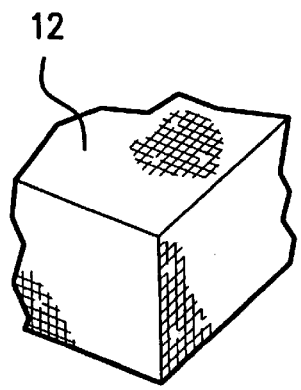
FIG. 15 is a partial prospective view partially broken away illustrating that the sheet of material is fabricated of textile.

In FIG. 12, a sheet processing apparatus 410 of the invention is illustrated. The sheet processing apparatus 410 can be a scanner, a sorter, a metal cutting/forming device, a rubber cutting/forming device, a textile cutting/sewing device or any other type of equipment that processes sheets of material. By way of example, the metal cutting/forming device would process sheets of metal as shown in FIG. 13. The rubber/forming device would process sheets of rubber as shown in FIG. 14. The textile cutting/showing device would process sheets of textile as shown in FIG. 15.

The sheet processing apparatus 410 of the invention includes sheet material 12 that is disposed in the source tray 30. As illustrated, the sheet material includes indicia that forms a code that identifies information that is related to the sheet material 12. The sheet processing apparatus 410 also includes the code reader device 24 and the processor 28. The code reader device 24 reads the code on the sheets of material. The processor 28 which communicates with the code reader device 24 causes the sheet processing apparatus 410 to process the sheets of material 12 based upon the code read from the code reader device 24.

Also, the sheet processing apparatus 410 of the invention includes a sheet feeder device 48. The sheet feeder device 48 feeds individual ones of the sheets of material 12 for sheet processing by the sheet processing apparatus 410 of the invention.

It is appreciated that the sheet processing apparatus 410 of the invention could modify its performance capabilities based upon the identified information related to each sheet of material. For example, upon identifying the sheet of material 12 as a certain gauge of copper, the sheet processing apparatus 410 of the invention could adjust the size and locations of any holes to be punched in the copper sheet. Also, it is appreciated that the sheet processing apparatus 410 of the invention could optimize its performance parameters. For instance, knowing the type of metal as well as its thickness, the sheet processing apparatus 410 of the invention can adjust the amount of impact force required to punch holes into the metal sheet to minimize consumption of power and minimize frequency of changing the hole punches.

While the invention has been described with reference to what is presently considered to be the preferred embodiments thereof, it is to be understood that the invention is not limited to the disclosed embodiments or construction. To the contrary, the invention is intended to cover various modifications and equivalent arrangements.

What is claimed is:

1. An encoded image recording medium, comprising:
   a sheet fabricated from an image recording material and having a first surface, a second surface disposed opposite the first surface and an edge extending peripherally about the sheet between the first and second surfaces, the edge having indicia arranged thereon to form a code identifying at least one physical characteristic of the sheet.

2. An encoded image recording medium according to claim 1, wherein the image recording material is one of paper and plastic.

3. An encoded image recording medium according to claim 1, wherein the indicia are one of visible indicia and invisible indicia.

4. An encoding image recording medium according to claim 1, wherein the indicia are formed by an invisible ink, the ink being readable when exposed to an ultra-violet light source.

5. An encoded image recording medium according to claim 1, wherein the indicia are readable by a scanner device operably connected to and in conjunction with a computer-implemented processor.

6. An encoded image recording medium according to claim 1, wherein the at least one characteristic of the sheet is one of a weight of the sheet, a thickness of the sheet, a quality of the sheet, a stiffness of the sheet, a grain orientation of the sheet, a classification of the sheet, a punch hole pattern of the sheet and an orientation of the sheet.

7. An encoded image recording medium according to claim 6, wherein the classification of the sheet is one of a standard sheet of paper, a transparent sheet of plastic, an opaque sheet of plastic and a coated sheet of paper.

8. An encoded image recording medium according to claim 1, wherein the sheet includes at least three edge portions, at least two of the at least three edge portions having indicia formed thereon.

9. An encoded image recording medium according to claim 8, wherein the indicia formed on the at least two of the three edge portions are one of identical to each other and different from each other.

10. An encoded image recording media, comprising:
    a plurality of sheet stacked in facial registration with one another, each sheet fabricated from an image recording material and having a first surface, a second surface disposed opposite the first surface and an edge extending peripherally about the sheet between the first and second surfaces, the edge having indicia arranged thereon to form a code identifying at least one physical characteristic of the sheet on which the code is formed.

11. An encoded image recording media according to claim 10, wherein the indicia of each sheet relative to remaining ones of the plurality of sheets are one of identical to each other, different from each other and a combination of identical to each other and different from each other.

12. An encoded sheet material, comprising:
    a sheet of material having a first surface, a second surface disposed opposite the first surface and an edge extending between the first and second surfaces of material, the edge having indicia arranged thereon to form a code identifying at least one physical characteristic of the sheet of material.

13. An encoded sheet material according to claim 12 wherein the sheet of material is one of paper, plastic, rubber, metal and textile.

14. An encoded sheet material according to claim 12, wherein the indicia are readable by a scanner device operably connected to and in conjunction with a computer-implemented processor.

15. An encoded image recording medium, comprising:
    a sheet fabricated from an image recording material and having a first surface, a second surface disposed opposite the first surface and an edge extending peripherally about the sheet between the first and second surfaces, the edge having indicia arranged thereon to form a code identifying at least one characteristic of the sheet;
    wherein the indicia are formed by an invisible ink, the ink being readable when exposed to an ultra-violet light source.

16. An encoded image recording medium according to claim 15, wherein the image recording material is one of paper and plastic.

17. An encoded image recording medium according to claim 15, wherein the indicia are one of visible indicia and invisible indicia.

18. An encoded image recording medium according to claim 15, wherein the indicia are readable by a scanner device operably connected to and in conjunction with a computer-implemented processor.

19. An encoded image recording medium according to claim 15, wherein the at least one characteristic of the sheet is one of a weight of the sheet, a thickness of the sheet, a quality of the sheet, a stiffness of the sheet, a grain orientation of the sheet, a classification of the sheet, a punch hole pattern of the sheet and an orientation of the sheet.

20. An encoded image recording medium according to claim 19, wherein the classification of the sheet is one of a standard sheet of paper, a transparent sheet of plastic, and opaque sheet of plastic and a coated sheet of paper.

21. An encoded image recording medium, comprising:

a sheet fabricated from an image recording material and having a first surface, a second surface disposed opposite the first surface and an edge extending peripherally about the sheet between the first and second surfaces, the edge having indicia arranged thereon to form a code identifying at least one characteristic of the sheet;

wherein the sheet includes at least three edge portions, at least two of the at least three edge portions having indicia formed thereon.

22. An encoded image recording medium according to claim 21, wherein the image recording material is one of paper and plastic.

23. An encoded image recording medium according to claim 21, wherein the indicia are one of visible indicia and invisible indicia.

24. An encoded image recording medium according to claim 21, wherein the indicia are readable by a scanner device operably connected to and in conjunction with a computer-implemented processor.

25. An encoded image recording medium according to claim 21, wherein the at least one characteristic of the sheet is one of a weight of the sheet, a thickness of the sheet, a quality of the sheet, a stiffness of the sheet, a grain orientation of the sheet, a classification of the sheet, a punch hole pattern of the sheet and an orientation of the sheet.

26. An encoded image recording medium according to claim 25, wherein the classification of the sheet is one of a standard sheet of paper, a transparent sheet of plastic, and opaque sheet of plastic and a coated sheet of paper.

* * * * *